United States Patent  [19]

Cherio et al.

[11] 3,726,059
[45] Apr. 10, 1973

[54] SEMI-AUTOMATIC APPARATUS FOR FILLING FOODSTUFF INTO TUBULAR NETTINGS

[76] Inventors: Vittoria Cherio; Giuseppe Mignone, both of Valle San Matteo, Cisterna D'Asti, Italy

[22] Filed: Dec. 15, 1971

[21] Appl. No.: 208,179

[30] Foreign Application Priority Data

July 2, 1971    Italy..............................69248 A/71

[52] U.S. Cl. ........................53/64, 53/197, 53/258
[51] Int. Cl. .............................................B65d 39/06
[58] Field of Search.........................53/197, 64, 258

[56] References Cited

UNITED STATES PATENTS 2,010,626    8/1935    Dietrich............................53/197 X
3,529,401    9/1970    Sartore et al.........................53/197

Primary Examiner—Travis S. McGehee
Attorney—Clario Ceccon

[57] ABSTRACT

The continuous presence and availability of gathered netting for filling of foodstuff into a receiving net by means of a tubular extruder is ensured by the present semi-automatic apparatus, which provides for the automatic reciprocating motion of a carrier which gathers the net around the outlet of the extruder while at the same time, a photo electric eye controls the unfolding of the net and the stuffing operation of the process, by stopping the motor which drives the carriage and causing a fresh length of netting to be automatically positioned at the outlet of the extruder.

9 Claims, 7 Drawing Figures

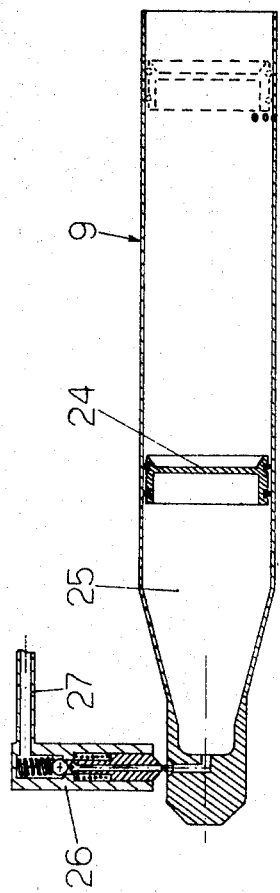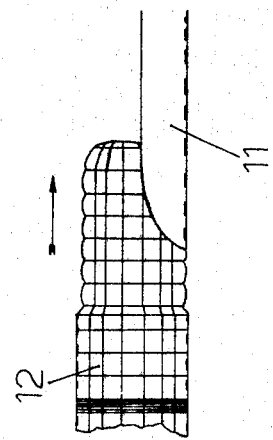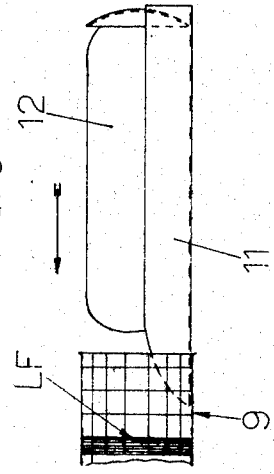

SEMI-AUTOMATIC APPARATUS FOR FILLING FOODSTUFF INTO TUBULAR NETTINGS

FIELD OF THE INVENTION

The present invention relates to a semi-automatic apparatus for stuffing foodstuff in general, and roast meats in particular, into tubular netting.

BACKGROUND OF THE INVENTION

A manually operated apparatus for filling tubular nettings with foodstuff has already been described in U.S. copending patent application Ser. No. 195,619, filed on Nov. 4, 1971 by the same applicants. This apparatus, as described, comprises a tubular extruder member onto which the netting to be filled is gathered and into which the foodstuff to be extruded is charged. This device is furthermore provided with a bench with sliding guides for a manually operated carrier, which carrier has netting-dragging means and serves the purpose of gathering, in correspondence of the outlet of the tubular extruder, a quantity of netting equal to a multiple of length of the extruder member. The netting is then unfolded as the filling operation progresses.

BRIEF SUMMARY OF THE INVENTION

Briefly stated the present apparatus is an improvement upon said disclosed manually-operated device. The present apparatus provides for the automation of the heretofore manually-effected operations, so as to increase considerably the yield of the apparatus.

Particularly noteworthy is the automation of the movement of the said carrier, in order to insure the continuous presence and availability of gathered netting at the outlet of the tubular extruder, thus avoiding the otherwise necessary interruption in the stuffing operation when the gathered quantity of netting is exhausted.

It is another object of the invention to provide an apparatus for filling foodstuff into netting, wherein the extrusion of the product from the tubular extruder is also automated and controlled by the operator concurrently with the ungathering or unfolding of a predetermined quantity of netting for stuffing of foodstuff therein.

Still another object of the invention is to provide an apparatus for stuffing foodstuff into tubular netting, which apparatus is structurally simple, rapidly operative and, concurrently, reliable in its operation.

These and other objects of the present invention, as explained in greater detail hereinafter, are achieved mostly because of the fact that the net-gathering means is provided with a pitman and a connecting link actuated by an electric motor, the drive of which is controlled by photo electric means responsive to the presence of netting gathered in correspondence to a reference line provided adjacent to the outlet section of the extruder.

These objects are also achieved because of the fact that the extruder is provided with an extruding piston freely slidable within the extruding chamber upon being actuated by a pressurized fluid fed to the extruder by control means operated by the operator of the apparatus, said control means concurrently controlling the unfolding of a quantity of netting commensurate with the volume of foodstuff to be stuffed in the netting.

THE DRAWINGS

These and other objects of the present invention will become more apparent from the following detailed description thereof and from the accompanying drawings, presented solely by way of illustration, in which:

FIG. 5 is a schematic sectional view, drawn to a larger scale and taken along the lines V—V of FIG. 3; and FIGS. 6 and 7 are additional schematic views of the apparatus of the invention illustrating two successive operational steps thereof.

DETAILED DESCRIPTION OF THE INVENTION

Figure 2:
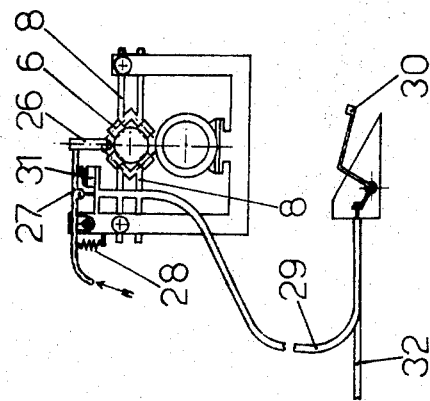
FIG. 2 is a frontal view taken along the lines II—II of FIG. 1.
Figure 3:
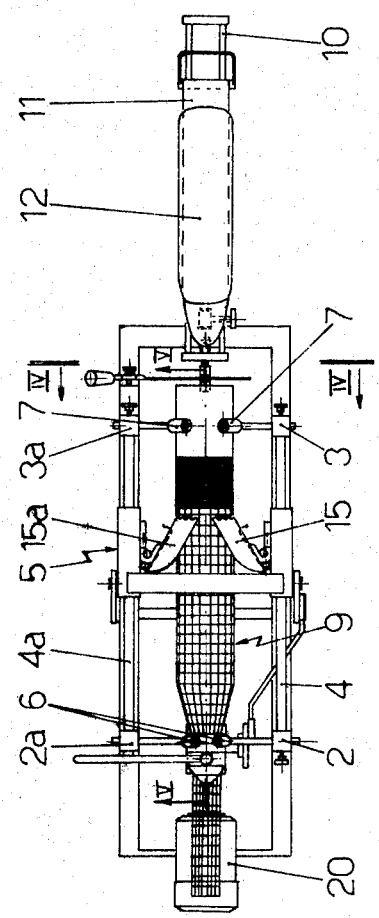
FIG. 3 is a top view of FIG. 1.

With reference to the accompanying drawings, the apparatus of the invention comprises a rigid frame 1 with vertical supports 2–3 and 2a–3a. These supports carry horizontally sliding guides 4–4a for a sliding carriage indicated generally at 5. The supports 2–3 and 2a–3a also carry each a group of four rollers 6 and 7, respectively mounted so as to be rotatable with respect to the extremity of a bifurcated support 8 — see FIG. 2. These rollers serve the purpose of retaining and centering the extruder tube indicated generally at 9. The extruder, preferably of metal, has a blind, conical end adjacent to a cylindrical section onto which operate the retaining and centering rollers 6. The end opposite to the conical blind end, hereafter called the outlet, is contacted and engaged by the retaining and centering rollers 7 and is aligned with a small frame 10 which slidably supports a blade 11 by which the foodstuff 12 is fed inside the extruder 9. By means of a pinion and rack controlling mechanism 13, the frame 10 may be displaced vertically for alignment with the extruder 9. The netting 14, preferably elastic netting, into which the foodstuff is to be placed, is fed onto the extruder 9. The netting is continuously unwound from a suitable feeding reel (not shown) and is gathered in correspondence to the outlet of the extruder 9 by the action of jaws 15. These jaws are carried by the sliding carriage 5 and include jaws 15–15a, preferably made of resilient material, connected to the carriage 5 in such a way as to be swinging in the horizontal plane — see FIG. 3 — each against the action of a respective spring.

Figure 1:
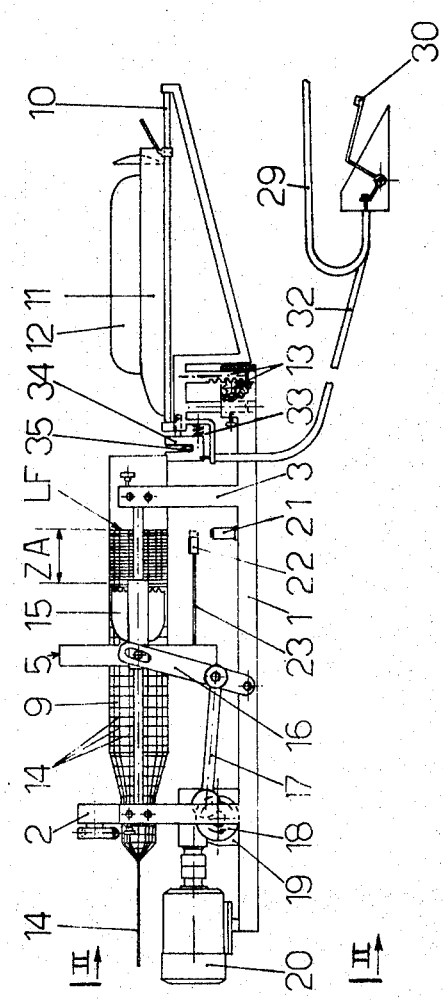
FIG. 1 is an elevational side view of the apparatus of the invention.

To obtain the gathering of the netting, the carriage 5 is provided with a reciprocating motion along the sliding guides 4–4a. To this purpose, the carriage 5 includes a mechanism with connecting link 16 and pitman 17, the foot of which is connected to a flywheel 18 moved by a reducer 19 operately connected to an electric motor 20. The range of swinging of the carriage is predetermined so that the net-dragging jaws 15 may come to a stop (so as to reverse the direction of motion) slightly beyond the middle section of the extruder to leave free a gathering section, as shown by ZA in FIG. 1. This section ZA is defined, in correspondence to the outlet of the extruder, by a reference line LF.

When the sliding of the carriage causes the same to reach the reference line LF, the carriage automatically comes to a stop. The stopping is obtained by means of photo electric cell 21 positioned in juxtaposition with said reference line. The photo electric cell 21 constitutes, therefore, a photo electric interruptor responsive to the presence of netting gathered in correspondence with the reference line.

The photo electric means includes finally a screen 22 which is connected through a rigid arm 23 to the carriage 5, the reciprocating movements of which it follows. Screen 22 is aligned with the photo electric cell when the pitman 17 is in the dead position during its forward movement, that is, in the position of maximum swing. In this particular position, the screen 22 covers the photo electric cell and cancels the operation thereof.

This automatic operation of the apparatus may be described as follows: As long as the tubular section covered by the gathered netting does not reach the reference line LF, the cell 21 "sees" the reflecting surface of the extruder 9, even if the screen 22 (made of reflecting material) is withdrawn during the return trip of the carriage 5. However, when the netting reaches the reference line LF, when the screen 22 is withdrawn, the cell 21 "sees" the netting (which has a non-reflecting surface) and intervenes to cause the stopping of motor 20 by means of any suitable interrupting means, such as, for example, a micro-relay.

Furthermore, always according to the invention, within the extruder 9 — see FIG. 5 — there is located a piston 24, freely slidable within the extruder and, concurrently, fluidtight during operation. The piston is actuated by a pressurized fluid, preferably compressed air, fed into chamber 25 upstream of the piston by the action of a valve-actuated nozzle 26. The nozzle is carried by an arm 27 which swings against the action of a spring 28 and is set in swinging motion by a flexible control cable 29, preferably of the Bowden type, the cable being set in tension by a control pedal 30. Arm 27 is hollow so as to allow the passage therein of the compression fluid. During the positive swinging movement, the arm 27 actuates a microswitch 31 which causes the motor 20 to stop.

It is also to be noted that the nozzle 26 is normally detached from the corresponding inlet to the chamber 25 — see FIG. 5; it approaches the said inlet, when the motor 20 is not operative, due to the swinging action of arm 27 caused by the actuation of pedal 30. The extruder 9, in correspondence with each retaining and centering roller 6, is provided with a slight concavity of a radius substantially equal to the radius of each roller. This concavity serves the purpose of preventing the extruder 9 from axial and rotational movements and of keeping the nozzle 26 in continuous perfect alignment with the fluid inlet to chamber 25 of the extruder. Briefly stated, the actuation of pedal 30 determines the introduction into chamber 25 of the pressurized fluid, which pushes the extruding piston 24 toward the outlet of the extruder 9 and in the position shown in phantom in FIG. 5.

Figure 4:
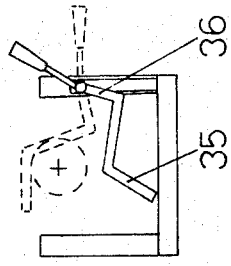
FIG. 4 is a transverse section taken along the lines IV—IV of FIG. 3.

Associated with pedal 30 there is a second flexible cable 32 which controls the swinging motion (against the action of spring 33) of a block 34. Block 34 engages the rim of the outlet section of extruder 9 and control the unfolding of the netting from the extruder. Block 34 is a U-shaped member which contains a blade 35 of a lever web slitting device 36 having a profile substantially Z-shaped — see FIG. 4 — and serving the purpose of severing the netting after the stuffing operation is completed.

The apparatus of the invention operates as follows: initially, by acting on pedal 30, the piston 24 is forced to advance and the block 34 is set in swinging motion. The swinging of block 34 frees the rim of the outlet of the extruder 9. Then, a quantity of netting is manually pulled beyond the outlet of the extruder. Subsequently, after releasing the pedal 30, the blade 11 with foodstuff 12 thereon is introduced into the extruder and, in so doing, pushes the piston 24 to its starting position at the head of the extruder — see FIG. 6. The blade 11 is then removed and the netting is closed, to form the blind end of the receiver. After this initial phase of the operation, pedal 30 is acted upon and the compression fluid forces the foodstuff into the receiving net — see FIG. 7 — with the resultant unfolding of a given length of netting from the extruder. The unfolding is made possible by the concurrent disengagement of the block 34 from the rim of the extruder. Terminated the extrusion phase, pedal 30 is released and the unfolding of the netting is stopped. The web slitting device 36 is then actuated to sever the netting and complete the operation of stuffing.

Thereafter, the apparatus is immediately ready to repeat the cycle, which is initiated again by re-inserting the blade 11 and the foodstuff 12 into the extruder. As the netting is slowly becoming exhausted in the section ZA of the extruder, the reflecting outer surface thereof becomes uncovered and when the photo cell 21 "sees" the absence of netting at the reference line LF, the motor 20 is energized, thus supplying a fresh quantity of netting in the area AZ of the extruder. Because of the retaining and centering of the extruder 9 by means of rollers 6, 7, the extruder may be readily replaced by others of different diameter, so as to increase the versatility of operation of the apparatus.

It is understood that modifications and alterations within the ordinary skill of the artisan are possible without, however, leaving the spirit and scope of the present invention and of the following claims.

What we claim and wish to secure by Letters Patent of the United States is:

1. Semi-automatic apparatus for stuffing foodstuff into tubular netting, wherein a predetermined quantity of netting is gathered by means of a sliding carriage upon a tubular extruder, comprising the combination of: a gathering carriage having a pitman-connecting link mechanism provided therewith; a motor for actuating said mechanism; a photo electric switch means for controlling the drive of said motor, said photo electric switch means being responsive to the presence of netting gathered in correspondence with a reference line provided on said extruder in the vicinity of the outlet thereof; a fluid-tight and freely slidable extruding piston within the body of said extruder, said piston being actuated by a compressive fluid; control means for introducing said fluid against said piston and for concurrently unfolding a predetermined quantity of said netting proportionately to the volume of said foodstuff to be stuffed.

2. The apparatus according to claim 1, wherein said carriage for the gathering of said netting includes jaw-like retaining means comprising at least two resilient jaws connected to said carriage so as to be capable of swinging motion in a horizontal plane and against the action of corresponding springs.

3. The apparatus according to claim 1, wherein said pitman-connecting link mechanism is actuated by a flywheel, said flywheel being moved by a gear reducer operatively connected to said motor.

4. The apparatus according to claim 1, wherein said photo electric switch means comprise a photo electric cell operatively associated with a screen, said screen being connected with said carriage for rendering inoperative said photo electric cell whenever said pitman-connecting link mechanism is in the maximum swinging horizontal position obtainable by said pitman.

5. The apparatus according to claim 4, wherein the outer surface of the extruder and the surface of said screen are reflective surfaces capable of activating said photo electric cell, said cell upon activation causing said motor to stop.

6. The apparatus according to claim 1, wherein said control means for introducing said fluid against said piston comprise a valve-actuated nozzle, a swinging arm for supporting said nozzle, and a flexible control cable to actuate said swinging arm.

7. The apparatus according to claim 6, wherein said nozzle is normally detached from the inlet to the extruder, said nozzle approaching said inlet as a result of the swinging motion of said arm, said arm controlling a microswitch for arresting the motor.

8. The apparatus according to claim 1, wherein said netting is unfolded from said extruder by means of the action of a control block, said block engaging the outlet of said extruder at the outer rim thereof and disengaging said outlet rim by means of a swinging action produced by another flexible cable cooperative with said control pedal.

9. The apparatus according to claim 8, wherein said control block is substantially U-shaped, and contains the blade of a web-slitting means.

* * * * *